(12) United States Patent
Kudryavtsev et al.

(10) Patent No.: US 11,260,366 B2
(45) Date of Patent: Mar. 1, 2022

(54) METHOD OF OBTAINING INORGANIC SORBENTS FOR EXTRACTION OF LITHIUM FROM LITHIUM-CONTAINING NATURAL AND TECHNOLOGICAL BRINES

(71) Applicants: Pavel Kudryavtsev, Haifa (IL); Nikolai Kudriavtsev, Haifa (IL); Iliya Kudryavtsev, Perm (RU)

(72) Inventors: Pavel Kudryavtsev, Haifa (IL); Nikolai Kudriavtsev, Haifa (IL); Iliya Kudryavtsev, Perm (RU)

( * ) Notice: Subject to any disclaimer, the term of this patent is extended or adjusted under 35 U.S.C. 154(b) by 425 days.

(21) Appl. No.: 16/504,191

(22) Filed: Jul. 5, 2019

(65) Prior Publication Data

US 2021/0001309 A1  Jan. 7, 2021

(51) Int. Cl.
*B01J 20/30* (2006.01)
*B01J 20/08* (2006.01)

(52) U.S. Cl.
CPC ........... *B01J 20/3078* (2013.01); *B01J 20/08* (2013.01); *B01J 20/3021* (2013.01); *B01J 20/3028* (2013.01); *B01J 20/3042* (2013.01); *B01J 20/3085* (2013.01)

(58) Field of Classification Search
CPC .... B01J 20/3078; B01J 20/08; B01J 20/3021; B01J 20/3028; B01J 20/3042; B01J 20/3085
See application file for complete search history.

(56) References Cited

U.S. PATENT DOCUMENTS

| | | |
|---|---|---|
| 6,901,032 B1 | 5/2005 | Eo et al. |
| 7,943,113 B2 | 5/2011 | Chung et al. |
| 8,926,874 B2 | 1/2015 | Chung et al. |

FOREIGN PATENT DOCUMENTS

| | | |
|---|---|---|
| CN | 101944600 A | 1/2011 |
| WO | 2003041857 A1 | 5/2003 |

OTHER PUBLICATIONS

In Transactions of Higher-Education Institutions (Izvestiya Vuzov) "Non-ferrous Metallurgy" (Tsvetnaya metallurgiya), 1978, No. 3, pp. 50-53, P. Kudryavtsev, et al.

*Primary Examiner* — James A Fiorito

(57) ABSTRACT

The invention provides a method of obtaining inorganic sorbents for extraction of lithium from lithium-containing natural and technological brines. The method consists of steps of obtaining six consecutive non-stoichiometric compound, wherein at the final step the sixth non-stoichiometric compound is obtained by converting the fifth non-stoichiometric compound into a hydrogen-form of inorganic ion-exchanger by treating the fifth non-stoichiometric compound with an acid solution. The method improves selectivity and exchangeability of sorbents to lithium based on manganese oxides, as well as chemical stability of the sorbents in cyclic operations.

19 Claims, 2 Drawing Sheets

METHOD OF OBTAINING INORGANIC SORBENTS FOR EXTRACTION OF LITHIUM FROM LITHIUM-CONTAINING NATURAL AND TECHNOLOGICAL BRINES

FIELD OF THE INVENTION

The invention relates to the field of chemical technology, namely, to the production of selective inorganic sorbents for the extraction of lithium from lithium-containing natural and technological brines and can be used in the extraction of lithium from natural and technological lithium and lithium-containing brines poor in lithium. In particular, the invention relates to the aforementioned method, which is carried out on highly selective inorganic ion-exchange materials using ion-exchange processes.

DESCRIPTION OF THE PRIOR ART

Lithium is historically extracted from two different sources—continental brines and minerals of hard rocks. At the present time, lithium finds use in the production of glass, ceramics, medical substances, metallurgical products, as well as in such fields as nuclear energy, aviation, etc. Demand for lithium will certainly grow when vehicles become greener, and electricity becomes cleaner. World sales of lithium salts currently amount more than $1 billion a year, because this element becomes an important component of lithium-ion batteries, which now feed everything from electric cars to power tools and smartphones.

According to forecasts, over the next eight years, the demand for lithium will increase by more than 300%. Nevertheless, whenever larger electric companies expand the power of solar energy, demanding the storage of high-density energy Li-ion batteries, the demand for lithium can skyrocket. As an example, Duke Energy (one of the world leaders in the production of energy) currently stopped the proposed nuclear power plant in Florida and instead plans to invest in a $6 billion solar and battery infrastructures. The ever-increasing demand for batteries and the need to store high-density energy created an acute dependence of many industries of the world industry on lithium, which triggered a global search for new lithium sources.

Nowadays, hydro-mineral raw materials gradually become the main source of lithium. The main attention is paid to the development of methods for processing lithium-containing hydromineral raw materials. The most commonly used in practice is a method of extracting lithium from natural brines by precipitation of sparingly soluble salts. However, from an ecological point of view, more promising are sorption methods of extraction of lithium from natural and technological brines that are poor in lithium content. In view of complexity of the salt composition of hydromineral raw materials, the use of highly selective inorganic ion-exchange materials is the most promising method for recovery of lithium.

Chinese Patent Application Publication CN101944600A published on Jan. 12, 2011 (Inventors: Xichang Shi, et al.) discloses an ion sieve adsorbent for extraction of lithium ions based on lithium-titanium oxide and a method for preparing a precursor for this ion sieve adsorbent suitable for adsorbing enriched lithium from salt lake brines, seawater, and other liquid lithium resources. The method consists of using titanium dioxide and a lithium salt as raw materials, grounding the raw material in a ball grinder, and drying the grounded product for preparing lithium titanate as the aforementioned precursor through a high-temperature solid-phase roasting process. The lithium is then eluted from the precursor ($Li_2TiO_3$) by inorganic acid to prepare an ion sieve $H_2TiO_3$. According to a preferred embodiment, the process is based on a molar ratio of lithium to titanium of 2:1; anhydrous ethanol or acetone is used as a dispersion medium; grinding is carried out in a ball mill from 2 to 3 hours; the grounded product is calcined at 800° C. for 12 hours, and a lithium $Li_2TiO_3$ adsorbent is obtained.

U.S. Pat. No. 8,901,032 issued on Dec. 2, 2014 to Stephen Harrison, et al. discloses a method for producing a porous adsorbent based on activated alumina for lithium extraction. The method is carried out by contacting three-dimensional activated alumina with a lithium salt under conditions sufficient to infuse lithium salts into activated alumina for the selective extraction and recovery of lithium from lithium-containing solutions, including brines. Lithium intercalated sorbent based on activated alumina provides a controlled and maximum permissible lithium to aluminum ratio, and a favorable structural shape and dispersed composition, thereby providing increased throughput for extracting lithium. In certain embodiments, the lithium intercalated sorbent based on activated alumina has a molar fraction ratio of lithium to aluminum in the range of about 0.1 to 0.3, and preferably up to about 0.33. The ratio of lithium to alumina is critical in stabilizing the structural form of the material and maximizing the number of lithium sites available in the matrix for loading and unloading of lithium from the brine solution.

International Patent Application Publication No. WO2003041857 A1 published on May 22, 2003 (Inventor: Alexander Ryabstsev, et al.) relates to a method for producing granulated sorbents in the form of the double hydroxide of aluminum and lithium in a waste-free solid phase of aluminum hydroxide and lithium salts in a mixer, with subsequent continuous activation of crystalline DHAL-CI in a centrifugal mill activator in order to obtain a defective crystalline structure. The obtained product is mixed with chlorinated polyvinyl chloride, as a binding agent, and with liquid methylene chloride. The granulated sorbent is suitable for selective extraction of lithium from chloride salt minerals with an extraction degree of 95%.

In addition, known is Russian Patent No. RU1524253 issued on Feb. 15, 1994 to Melikhov, et al. This patent relates to a method of ion-exchange removal of lithium from solutions. The method includes the steps of passing the solutions through a sorption material consisting of a sorbent selective to lithium and based on manganese oxides or manganese and aluminum oxides in a hydrogen form and an auxiliary sorbent in a salt form, followed by their regeneration, respectively, with a solution of nitric acid and alkaline solution. The method is characterized in that, in order to increase the degree of lithium recovery from the natural and technological brines, as well as the degree of regeneration of the auxiliary sorbent and the reduction of the regeneration time, the sorbent is selective to lithium in an alkaline medium based on titanium hydroxide, the transmission is conducted through alternating layers of the selective and auxiliary sorbents, and the regeneration of the auxiliary sorbent is carried out with the original lithium solution at pH 12-13. A hydrated titanium dioxide or a mixed hydroxide of titanium and iron is used as an auxiliary sorbent. A disadvantage of this method is that the obtained sorbent has low stability in the presence of oxidants or reducing agents.

U.S. Pat. No. 7,943,113 issued on May 17, 2011 to Chung; Kang-Sup, et al. provides a method of obtaining lithium-manganese oxides having layered structures and expressed by the following formula:

$Li_{1+x}Mn_{1-xy}M_yO_{2+z}$, wherein the following condition is observed:
0.01≤x≤0.5, 0≤y≤0.3, −0.2≤z≤0.2, and where M is a metal selected from the group consisting of Mn, V, Cr, Co, Ni, Cu, Zn, Zr, Nb, Mo, W, Ag, Sn, Ge, Si, Al, and alloy thereof. The method consists of preparing a solid mixture of lithium raw material, manganese raw material, and metal raw material and heat-treating the obtained mixture under reduction atmosphere.

The reduction atmosphere is selected from the group consisting of nitrogen atmosphere, argon atmosphere, nitrogen/hydrogen mixed gas atmosphere, carbon monoxide/carbon dioxide mixed gas atmosphere, helium atmosphere, and combination thereof, and the heat treatment is performed at a temperature 300-1400° C.

U.S. Pat. No. 8,926,874 issued on Jan. 6, 2015 to Chung; Kang-Sup, et al. provides a porous manganese oxide absorbent for lithium having spinel type structure and a method of manufacturing the same. This invention relates to a porous manganese oxide-based lithium absorbent and a method for preparing the same. The method includes the steps of preparing a mixture by mixing a reactant for the synthesis of a lithium-manganese oxide precursor powder with an inorganic binder, molding the mixture, preparing a porous lithium-manganese oxide precursor molded body by heat-treating the molded mixture, and acid-treating the porous lithium-manganese oxide precursor molded body such that lithium ions of the porous lithium-manganese oxide precursor are exchanged with hydrogen ions, wherein pores are formed in the lithium-manganese oxide precursor molded body by gas generated in the heat treatment. The method comprising the steps of: preparing a lithium-manganese oxide precursor molded body by preparing a mixture by adding an additive comprising at least one selected from the group consisting of carbon powder, carbon nanotubes (CNT), polyethylene (PE), and polypropylene (PP) to a lithium-manganese oxide precursor reactant, adding water glass to the mixture, and heat-treating the resulting mixture, wherein the water glass is added in an amount of 10 to 60 parts by weight with respect to 100 parts by weight of the mixture; and acid-treating the lithium-manganese oxide precursor molded body, wherein in the heat treatment, pores are formed in the lithium-manganese oxide precursor molded body by gas generated by decomposition of the lithium manganese oxide precursor reactant or the water glass.

International Patent Application Publication No WO2011058841, published on May 11, 2019 (Inventor: Yoshizuka Kazuharu) discloses a method for producing lithium adsorbent, a method for producing starting materials for lithium adsorbent, a lithium concentration method, and a lithium concentration apparatus. This method includes a mechanochemical step of mixing trimanganese tetroxide and lithium hydroxide such that the molar ratio of manganese (x) and lithium (y) is x:y=1:1 to 1.5:1, and subjecting the mixture to mechanochemical pulverization; a pre-calcining step for then pre-calcining the product in a temperature range of 375° C. to 450° C. in air or in an oxygen atmosphere; a calcining step for then cooling, mixing, and pulverizing the product, followed by calcining it in a temperature range of 475° C. to 550° C. in air or in an oxygen atmosphere in order to obtain a spinel-type lithium manganate with excess oxygen; and an elution step for eluting lithium by treating the spinel-type lithium manganate with excess oxygen using an acid in an amount that is in large excess with respect to the amount of lithium.

In Transactions of Higher-Education Institutions (lzvestiya Vuzov) "Non-ferrous Metallurgy" (Tsvetnaya metallurgiya), 1978, No. 3, pp. 50-53, P. Kudryavtsev, et al. discloses an inorganic ion-exchanger ISN-1 selective to ions of lithium. The publication discloses a method of obtaining an inorganic sorbent for extracting lithium from natural and technological brines. The method involves contacting the soluble niobates (V) with an acid, granulating the resulting precipitate, transferring the obtained product to calcining at an elevated temperature, and then converting the product into an H-form.

Pending U.S. patent application Ser. No. 15/841,760 filed on Dec. 14, 2017 by P. Kudryavtsev for a "Method of Obtaining Inorganic Sorbents for Extracting Lithium from Lithium-Containing Natural and Technological Brines" discloses a method of obtaining inorganic sorbents for extracting lithium from lithium-containing natural and technological brines. According to the method, a soluble niobate (V) is contacted with an acid in the presence of at least one zirconium (IV) salt to obtain a precipitate of a mixed hydrated niobium and zirconium oxide, which is a non-stoichiometric compound. The obtained precipitate of a mixed hydrated niobium and zirconium oxide is granulated by freezing with subsequent defreezing to obtain a granulated mixed hydrated niobium and zirconium oxide, which is then converted into a Li-form of the granulated mixed hydrated niobium and zirconium oxide by treating the granulated mixed hydrated niobium and zirconium oxide with a lithium-containing compound selected from the group consisting of a solution of lithium hydroxide LiOH and a solution of $Li_2CO_3$; calcining the Li-form of the granulated mixed hydrated niobium and zirconium oxide to obtain a granulated mixed lithium, niobium, and zirconium oxide, which comprises a tripled mixed oxide, which is a Li-form of an inorganic ion-exchanger; and converting the obtained granulated mixed lithium, niobium, and zirconium oxide to an ion-exchanger in an H-form by treating the granulated mixed lithium, niobium, and zirconium oxide with an acid solution.

SUMMARY OF THE INVENTION

The method of the invention is intended to obtaining an inorganic sorbent for extracting lithium from natural and technological brines and relates to the field of chemical technology, namely, the production of inorganic sorbents selective for certain ions.

The purpose of the invention is to improve the selectivity and exchangeability of sorbents to lithium based on manganese oxides, as well as to improve the chemical stability of such sorbents in cyclic operations.

As mentioned above, the well-known method of P. Kudryavtsev et al. Involves contacting a solution of soluble niobate (V) with an acid in the presence of zirconium (IV) salts and with a ratio of niobium (V) and zirconium (IV) in the solution in the range of 1: (0.1 to 0.7). The resulting material of the lithium form is calcined at a temperature in the range of 450 to 600° C., and the final product is then treated with an acidic solution, for example, nitric acid solution, as a result of which the desired product, i.e., a hydrogen-form sorbent, is obtained.

The method according to the present invention differs from the aforementioned method by the combination and sequence of the following steps:
   a) obtaining a first non-stoichiometric compound by contacting a soluble manganese (II) salt with an alkali solution in the presence of at least one aluminum (III) salt to obtain a precipitate of hydrated mixed oxide of manganese (II) and aluminum (III) as a precipitate in a mother solution;

b) obtaining a second non-stoichiometric compound that comprises a precipitate of hydrated mixed oxide of manganese (III), manganese (IV) and aluminum (III) by oxidizing the first non-stoichiometric compound with the use of a solution of a strong oxidizing agent;

c) isolating the obtained second non-stoichiometric compound from the mother solution to obtain a wet paste of hydrated mixed oxide of manganese (III), manganese (IV) and aluminum (III);

d) obtaining a third non-stoichiometric compound by granulating and simultaneously drying the obtained second non-stoichiometric compound, i.e., the hydrated mixed oxide of manganese (III), manganese (IV) and aluminum (III);

e) obtaining a fourth non-stoichiometric compound by converting the hydrated mixed oxide of manganese (III), manganese (IV) and aluminum (III) into a lithium-form of the hydrated mixed oxide of manganese (III), manganese (IV) and aluminum (III);

f) calcining the obtained fourth non-stoichiometric compound to obtain a fifth non-stoichiometric compound which comprises a mixed oxide of lithium, manganese (III), manganese (IV) and aluminum (III); and g) obtaining a sixth non-stoichiometric compound by converting the obtained fifth non-stoichiometric compound into a hydrogen-form of inorganic ion-exchanger by treating the fifth non-stoichiometric compound with an acid solution.

The primary field of application of the obtained material is extraction of lithium from complex natural and technological brines.

DETAILED DESCRIPTION OF THE INVENTION

The invention relates to the field of chemical technology, namely, to the production of selective inorganic sorbents for the extraction of lithium from natural and technological brines. The invention may be used in the extraction of lithium from weakly acidic and neutral solutions with a high content of sodium ions and ions of other metals. In particular, the invention relates to the aforementioned method, which is carried out by using ion sieves.

The term "brines" used in the context of the present patent specification covers any natural or technological solutions that contain lithium.

Ionic sieves are inorganic ion-exchange sorbents that exhibit the so-called ion-sieve effect, which is the effect of separation of ions in a solution in accordance with the difference in their ionic radii. Dimension positions in crystal structure of the material corresponding to certain ions and ions of a larger size cannot enter unspecified positions. Thus, the ion-sieve effect provides high selectivity in the sieve-effect sorbents. A unique feature of the method of the present invention is that the method makes it possible to obtain inorganic ion-exchange sorbents with a specific structure that provides high selectivity, especially for lithium ions.

It is important to note that in the context of the present patent specification the term "hydrated mixed oxide, e.g., of manganese (III), manganese (IV), and aluminum" does not mean a mechanical mixture of hydrated manganese oxides with hydrated aluminum oxides, but rather means a chemical compound of non-stoichiometric composition.

The objective of the invention is to improve exchange capacity of the sorbent and its selectivity with respect to lithium ions.

This objective is achieved by the method of the invention, which is based on a combination of steps and their sequence as described below.

The first step of the sorbent-obtaining method is obtaining a first non-stoichiometric compound by contacting a soluble manganese (II) salt with an alkali solution in the presence of at least one aluminum (III) salt to obtain a precipitate of hydrated mixed oxide of manganese (II) and aluminum (III) as a precipitate in a mother solution. This step is carried out with a ratio of manganese (II) to aluminum (III) in the soluble manganese (II) salt and aluminum (III) salt within a range of 1:0 to 1:0.2.

Figure 1:
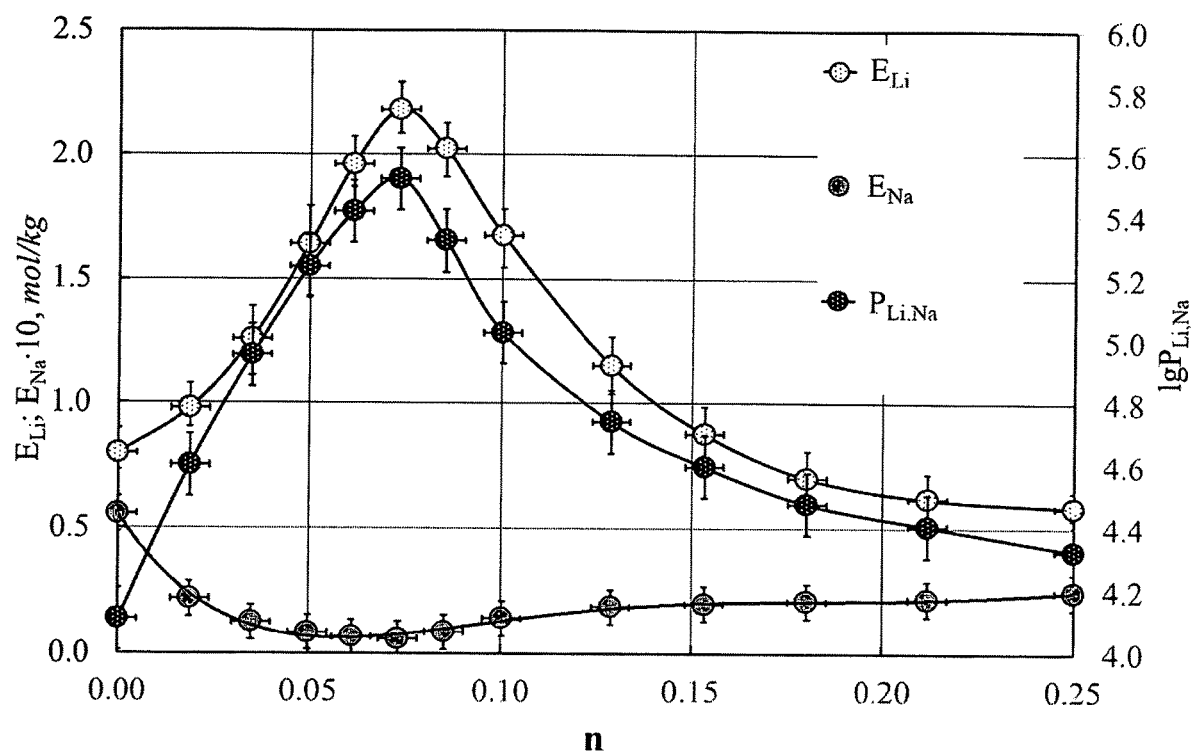
FIG. 1 is a graph showing dependence of the capacity for lithium ($E_{Li}$), sodium ($E_{Na}$) and the separation factor of lithium ions and sodium ($P_{Li,Na}$) on the content of alumina in the sorbent.

Such a range was chosen in the basis of experiments obtained in studying the effect of additives shown in FIG. 1, which is a graph showing the dependence of the capacity for lithium ($E_{Li}$), sodium ($E_{Na}$) and the separation factor of lithium ions and sodium ($P_{Li, Na}$) on the content of alumina in the sorbent. In this drawing, n is $$\frac{Al_2O_3}{MnO_x}$$

and expresses a molar ratio of oxides $Al_2O_3$ and $MnO_x$ in the composition of the inorganic sorbent. The optimal value is n=0.075±0.009.

Manganese (II) salt is selected from the group of most soluble salts of manganese and consists of $MnSO_4$, $MnCl_2$, $Mn(NO_3)_2$, $Mn(Ac)_2$. It is understood that these salts are shown as examples of most preferable and that other manganese salts can be used in the method of the invention.

The manganese (II) salt is used in concentration within a range of 0.1 mol/l to 2.0 mol/l. The choice of the upper limit of the concentration is due to the solubility limit of the represented manganese salts. The lower limit of concentration is determined by feasibility from an economic and environmental point of view, due to the need to use and dispose of, in this case, large amounts of water.

Here at least one aluminum (III) salt is selected from the group consisting of $Al_2(SO_4)_3$, $AlCl_3$, $Al(OH)Cl_2$, $Al(NO_3)_2$, $Al(Ac)_3$, $Na[Al(OH)_4]$, which are examples of most soluble salts of aluminum, pH of the obtained precipitate being brought to a value in the range of 9.0 to 11.0. Such range of precipitate pH is chosen from the point of view of complete precipitation of manganese hydroxides $Mn(OH)_2$ and aluminum $Al(OH)_3$. Outside this pH range, complete precipitation will not be achieved.

The second step of the process according to the method of the invention consists of obtaining a second non-stoichiometric compound, which is a precipitate of hydrated mixed oxide of manganese (III), manganese (IV), and aluminum (III) by oxidizing the first non-stoichiometric compound with the use of a solution of a strong oxidizing agent. This agent is selected from the group consisting of solutions of NaClO, $ClO_2$, $KMnO_4$, and $H_2O_2$. These solutions are shown as examples of solutions preferable due to simplicity of their use, good solubility in waster and availability of their industrial sources. Oxidation of the first non-stoichiometric compound with the use of the solution of a strong oxidizing agent is carried out to reach an average degree of oxidation of manganese in the range of 3.0 to 3.8. The choice of this range is based on experimental data. Degree of oxidation of manganese beyond the above range will result in significant decrease of ion-exchange properties of manganese oxides and prevent formation of phases with high selectivity of the obtained products to lithium ions.

The third step of the process is isolating the obtained second non-stoichiometric compound from the mother solution to obtain a wet paste of hydrated mixed oxide of manganese (III), manganese (IV), and aluminum (III), The isolation is carried out by filtering, centrifuging, centrifuge filtering, or the like. The isolation is continued until the resulting paste reaches humidity in the range of 50 to 80%. The range of 50% to 80% is based on physical and mechanical properties of the paste. With a moisture content of more than 80%, the paste is too fluid for its granulation, besides, a high moisture content in the paste leads to an increased content of residual electrolytes after synthesis of the paste and to destruction by crystals of salts released after drying. Getting a paste with a moisture content of less than 50% requires a significant increase in filtration time or centrifugation, which is not justifiable from the economic point of view.

At the fourth step, a third non-stoichiometric compound is obtained by granulating and simultaneously drying the obtained second non-stoichiometric compounds, i.e., a hydrated mixed oxide of manganese (III), manganese (IV) and aluminum (III). Granulation with simultaneous drying of the obtained hydrated mixed oxide of manganese (III), manganese (IV) and aluminum (III) is carried out by a such a process as applying the paste on a corrugated surface having grooves of a predetermined width and extruding the paste through a die orifice having a diameter, wherein the width is in the range of 2 to 5 mm, and the diameter is in the range of 2 to 5 mm. The above process is given as an example. Granulated particles of the materials obtained by the above-describes process are most suitable for use in ion-exchange columns.

Drying of the paste is carried out at a temperature in a range of 15 to 40° C. and until the paste reaches humidity in the range of 25 to 40%. The temperature and humidity ranges given above prevent strong effect on the active ion-exchange centers of the material and allow keeping them intact for further exchange for lithium ions with maximum introduction of lithium into the composition of the material. The temperature and humidity ranges given above are selected based on physical and mechanical properties of the material obtained after granulation and drying. With a moisture content of more than 40%, material granules will be too soft and subject to destruction under small external influences. Obtaining granules with a moisture content of less than 25% will require a significant increase in the drying temperature, which is not advisable, as it will reduce the content of active exchange centers in the material.

At the fifth step of the method, a fourth non-stoichiometric compound is obtained by converting the obtained third non-stoichiometric compound into a lithium-form of the hydrated mixed oxide of manganese (III), manganese (IV) and aluminum (III). In this step, converting the hydrated mixed oxide of manganese (III), manganese (IV) and aluminum (III) into a lithium-form of the hydrated mixed oxide of manganese (III), manganese (IV) and aluminum (III) is carried out in an ion-exchange column having a column head. A solution of the lithium-containing compound is fed to the column head and passed through the column with a linear speed in the range 1 to 100 mm/min. Carrying out this process in an ion-exchange column provides maximum processing of all active centers of the material and their saturation with lithium ions.

Figure 2:
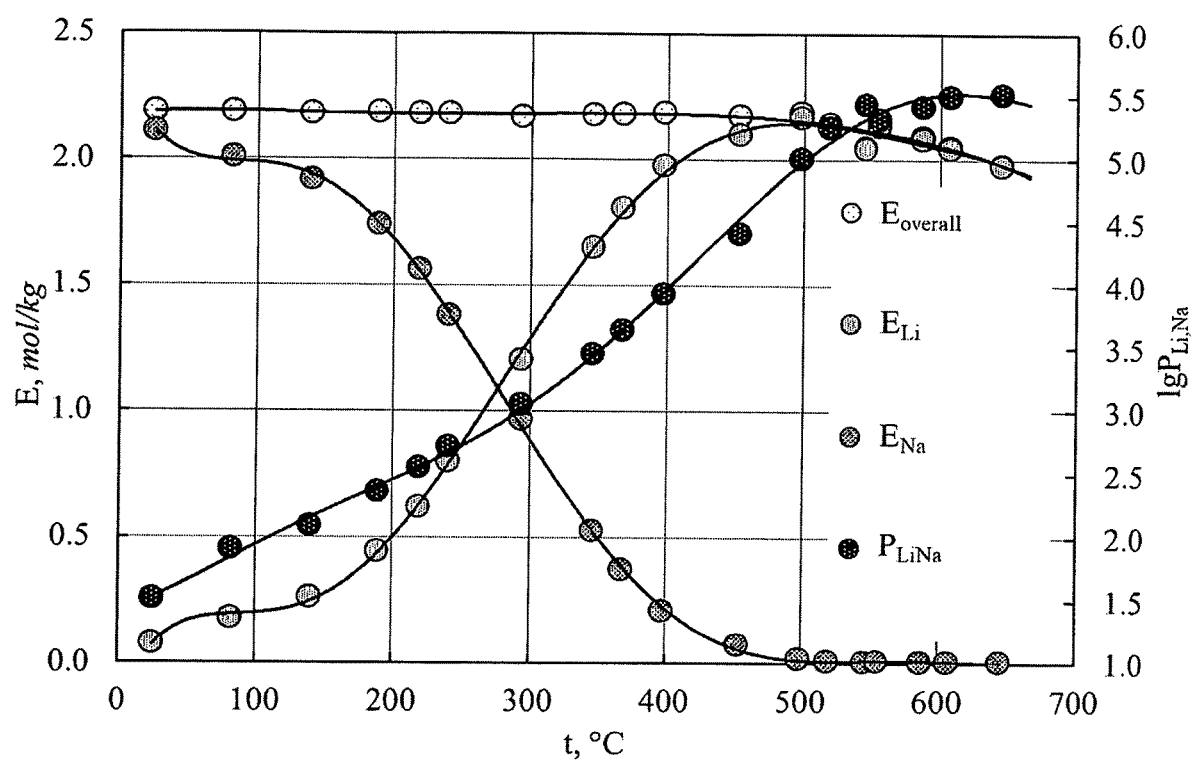
FIG. 2 is a graph illustrating the effect of heat-treatment temperature on the synthesis of a material and its sorption-selective properties.

The sixth step consists of calcining the obtained fourth non-stoichiometric compound for obtaining a fifth non-stoichiometric compound which comprises a mixed oxide of lithium, manganese (III), manganese (IV) and aluminum (III). Calcining is carried out at a temperature in a range of 300 to 600° C. during time in the range of 1 to 10 hours. A choice of this temperature interval is based on experimental data shown in FIG. 2, which is a graph illustrating the effect of heat treatment temperature on the synthesis of a material and its sorption-selective properties. In this drawing, $E_{overall}$ is a total sorbent capacity. $E_{Li}$ is a selective capacity for lithium during sorption from a complex solution containing 150 g/l of $Na^+$ and 20 mg/l of $Li^+$, $E_{Na}$ is a capacity for sodium during sorption together with lithium from the above solution. $P_{Li,\ Na}$ is a separation factor of lithium ions and sodium.

In this step, the lower limit of the time interval is determined by the minimum time required for the formation of the corresponding phases in the structure of the resulting sorbent. The upper limit is determined by the economic inexpediency of a longer heat treatment.

The seventh, final stage of the process of the invention consists of obtaining a sixth non-stoichiometric compound by converting the resulting fifth non-stoichiometric compound into a hydrogen form of the inorganic ion exchanger by treating the fifth non-stoichiometric compound with an acidic solution.

Treating the fifth non-stoichiometric compound with an acid solution is carried out by using an acid solution of hydrochloric acid, nitric acid, sulfuric acid, or the like with acid solution concentration in the range of 0.1 to 2 mol/l. Although other acids can also be used, the hydrochloric, nitric, and sulfuric acids are preferable based on a simplicity of their use, good solubility in water, and availability for purchasing. In this step, the lower limit of solution concentration is based on economic inexpediency of subsequent processing of dilute lithium salts obtained after the treatment of the sorbent with acid. The upper limit of the acid solution concentration is due to a decrease in the stability of the sorbent in more concentrated acid solutions.

The effectiveness of the method of the invention is illustrated by the examples below. It is clear, however, that these examples should not be construed as limiting the scope of the present invention and that they are given for illustrative purposes only.

The following methods and tools were used to process materials and measure the properties of the products obtained, mentioned in the following examples.

Equipment and Procedures Used in the Method of the Invention

Ion-Exchange Column

As ion-exchange column used in the method of the invention was a standard chromatographic column with a diameter of up to 10 mm. The height of the sorbent layer was maintained in the range of 10 to 15 column diameters. The solution was fed through the column at a constant linear speed, in the range of 1 to 10 mm/s. The feed rate of the solution was maintained by means of a peristaltic pump. During sorption experiments, special measures were taken to prevent air from entering the sorbent layer and partially dry the sorbent granules.

Determination of the Content of Lithium

Determination of lithium in solutions was carried out by the method of emission photometry of a flame. The most intense resonance line in the spectrum of lithium, 670.8 nm, was used for the analysis. This line corresponds to the transition between the energy levels $2^2S_{1/2}$ and $2^2P^0_{3/2}$ at the excitation energy of 1.85 eV. The sensitivity of the method, in determining lithium (with the use of the FLAME PHOTOMETER, FP8000 series device; A.KRÜSS Optronic), was 0.001-0.0005 µg Li/ml. The content of lithium was determined from the calibration based on reference solutions prepared based on pure metal salts and their mixtures present in the solutions under study, which were close in proportion to the test solutions. Determination of sodium content was carried out in a similar way.

Determination of the Content of Aluminum and Total Manganese

Determination of the content of aluminum and manganese in the composition of the investigated sorbent samples was carried out by X-ray fluorescence spectroscopy. The experiments were performed on a VRA-30 spectrometer. The source of excitation was a tube with a tungsten anode, operating at U=40 kV, I=30 mA. A pentaerythritol or LiF single crystals were used as the analyzer crystals. The registration was carried out using a proportional counter.

The determination of the content of aluminum was carried out along the line $K_\alpha$, the sensitivity of the method was 0.005%. Determination of the total manganese content was carried out along the line $K_\alpha$, the sensitivity of the method was 0.02%. The background in the analysis was taken into account by the method of linear interpolation and by using a blank sample. Samples of materials for X-ray fluorescence analysis were prepared by compressing them in the form of tablets with NaCl (S7653 SIGMA-ALDRICH>99.5% (AT)) at a pressure of 4000 kg/cm². The instrument was calibrated using samples containing fixed amounts of manganese (II) oxide (431761 SIGMA-ALDRICH 99.99% trace metals basis) and aluminum oxide (229423 SIGMA-ALDRICH 99.99% trace metals basis).

The Determination of the Content of Manganese

The content of Mn (II, III, IV) in the oxides was determined by dissolving a sample of a substance in a known volume of a titrated solution of oxalic acid in the presence of sulfuric acid. The atomic absorption method of analysis was used to determine the general content of manganese in solutions. To determine the content of manganese a line of 279.4 nm characteristic for this element was used.

The analysis was performed using an air-acetylene flame. The sensitivity of the method was 0.15 mg/ml. Li, Na, Al had no effect on the determination of manganese. Because inorganic acids have an impact on the determination of manganese, the acid content in the analyzed solution was reduced to a fixed value before the analysis, and nitric acid was used as the acid having the least effect.

Sorption-Selective Parameters

The following characteristics are taken as parameters describing sorption-selective properties: a total exchange capacitance $E_{Lio}$, obtained by using 0.1 N LiOH solution as a sorbent; a selective lithium capacitance $E_{Li}$ used for sorption from a solution of lithium and sodium salts at an ionic ratio Li$^+$: Na$^+$ in the range of 1 to 10 at pH=12; and a coefficient $P_{Li,Na}$ of selectivity of the sorbent with respect to lithium, which is a direct parameter that characterizes separation of lithium from sodium and which is represented by the following formula:

$$P_{Li,Na} = \frac{E_{Li1} \cdot C_{Na}}{E_{Na1} \cdot C_{Li}}$$

where $E_{Li1}$ is a selective lithium capacity at sorption from a solution of lithium and sodium salts at ionic ratio Li$^+$/Na$^+$ of 1/10 at pH=12 (mol/kg sorb.);

$E_{Na1}$ is a sodium capacity at sorption from a solution of lithium and sodium salts at ionic ratio Li$^+$/Na$^+$ of 1/10 at pH=12 (mol/kg sorb.);

$C_{Li}$ is a molar concentration of Li+ in a solution of lithium and sodium salts at ionic ratio Li$^+$/Na$^+$ of 1/10 at pH=12 (mol/l);

$C_{Na}$ is a molar concentration of Na$^+$ in a solution of lithium and sodium salts at ionic ratio Li$^+$/Na$^+$ of 1/10, pH=12 (mol/l).

EXAMPLES

Example 1

The starting material for the Li-selective ion exchanger was Mn(OH)$_2$. The coagulum of Mn(OH)$_2$ was precipitated by reacting a 1M solutions of MnSO$_4$ with a NaOH solution. During the synthesis, an additive of the calculated amount of Al$_2$(SO$_4$)$_3$ was introduced into the MnSO$_4$ solution. The Mn(OH)$_2$ coagulum with the addition of Al(OH)$_3$ was obtained in the form of a paste. A pH of the paste was 10.0÷10.2. The resulting coagulum Mn(OH)$_2$ was oxidized. To do this, a sodium hypochlorite solution of NaClO with a concentration of ~4 mol/l in active chlorine was introduced into the paste with stirring. Sodium hypochlorite was taken in an amount close to the stoichiometry for the oxidation reaction. As a result, a hydrated manganese oxide with an average oxidation degree of manganese of 3.1 to 3.3 was produced. After oxidation of the paste with sodium hypochlorite, the final pH of the paste was 10.7÷10.9.

The prepared paste was concentrated on a vacuum suction filter prior to the start of cracking of the sediment layer. At the same time, maximum removal of the mother liquor from the resulting paste was achieved. The thickened paste was then subjected directly to drying and granulation. For this purpose, the paste was applied with a layer of 5-6 mm on thin plates (sheets) with a corrugated surface. If the sheets were smooth, uniform grooves were formed on the applied layer of the paste by using a special tool. This procedure will accelerate drying of the paste and allow obtaining the primary granules of the same size. The size and shape of the recesses on the surface of the plates or the size of the grooves on the lined paste determine the grain size of the dried material. After drying, the material fell off from the surface the surface of the plates, which were installed in a vertical position and was collected. It is desirable that the paste layer on the filtering surface does not exceed 5 mm. Drying was carried out for 3-4 days prior to solidification of the paste particles. Dried paste was a solid gel of sufficiently high hardness and strength. After drying, the paste can be further crushed to a grain size of 5 mm.

Per 1 mol of manganese sulfate, the output of the dried paste was 135.9 g; anhydrous substance –98.07 g. The bulk density of the dried paste, with a particle size of <3 mm, was about 0.74÷0.76 g/cm³. The moisture content of the paste dried for 4 days was approximately 24%.

The obtained granules were loaded into an ion exchange column, where they were treated with 0.5 mol/l LiOH solution to saturate Li$^+$ ions. The size of the column provided the necessary capacity of the used quantity of dried and crushed paste granules. A ratio between the height of the layer of material in the column and its diameter L/D was in the range: L/D≥10÷15.

After this operation was completed, the material was discharged from the ion-exchange column and placed on a filter cloth to release free moisture and dry the obtained substance. The material could also be freed of moisture by placing on a vacuum suction filter. Drying was conducted in air for 1-2 days or when heated to 90-95° C. for 3-4 hours.

The air-dried material was calcined at a temperature of 450-500° C. (optimally 450° C.) for 4-6 hours. The material obtained after cooling was a Li-form sorbent. Per 1 mol of manganese sulfate, the yield of the sorbent in the Li-form was 101.03 g.

The sorbent was stored in a Li-form in a dry state. Before use, it was soaked in water, loaded into an ion exchange column for conversion into an H-form by treating under dynamic conditions with a solution of 0.3-0.5 mol/l $HNO_3$.

The material obtained after cooling was a Li-form sorbent. Per 1 mol of manganese sulfate, the yield of the sorbent in the Li-form was 101.03 g.

Testing of the sorbent was carried out by extracting lithium from a solution (dynamic conditions) having the following composition: (g/l): LiCl—0.121; NaCl—150. The ionic ratio of Li$^+$/Na$^+$ was 1:900.

Under conditions of saturation of the cation exchanger with Li$^+$, the process of sorption was characterized by the exchange capacity $E_{Li}$=2.2 mol/kg and the separation factor $K_{Li,Na}$=4.0·10$^5$. Desorption of lithium from cation exchanger proceeded easily and completely under the action of 0.3-0.5 mol/l solution of $HNO_3$. The loss of the sorbent according to the results of its tests for 12 cycles in the ion exchange column amounted to an average of not more than 0.5-0.8% per cycle.

Example 2

Similar to the previous example, the coagulum of Mn(OH)$_2$ was precipitated by reacting a 1M solutions of MnCl$_2$ with a KOH solution. During the synthesis, an additive of the calculated amount of AlCl$_3$ was introduced into the MnCl$_2$ solution. The Mn(OH)$_2$ coagulum with the addition of Al(OH)$_3$ was obtained in the form of a paste. A pH of the paste was 10.0÷10.1. The resulting coagulum Mn(OH)$_2$ was oxidized. To do this, a solution of KMnO$_4$ with a concentration of 0.2 mol/l was introduced into the paste with stirring. KMnO$_4$ was taken in an amount close to the stoichiometry for the oxidation reaction. As a result, a hydrated manganese oxide with an average oxidation degree of manganese of 3.1 to 3.3 was produced. After oxidation of the paste with KMnO$_4$, the final pH of the paste was 10.0÷10.1.

The prepared paste was concentrated in a filtration centrifuge until cracking occurred in the sedimentary layer. A result was maximum removal of the mother liquor from the paste. Then the thickened paste was subjected directly to drying and granulation. These processes were carried out as described in the previous Example 1.

Per 1 mol of manganese sulfate, the output of the dried paste was 141.1 g; anhydrous substance –101.1 g. The bulk density of the dried paste, with a particle size of <3 mm, was about 0.74÷0.76 g/cm$^3$. The moisture content of the paste dried for 4 days was approximately 23.5%.

The obtained granules were loaded into an ion exchange column, where they were treated with 0.5 mol/l LiOH solution to saturate Li$^+$ ions. Этот процесс осуществляли аналогично описанному в предыдущем примере 1.

After this operation was completed, the material was discharged from the ion-exchange column and placed on a filter cloth to release free moisture and dry the obtained substance. The material could also be freed of moisture by placing on a vacuum suction filter. Drying was conducted in air for 1-2 days or when heated to 90-95° C. for 3-4 hours.

The air-dried material was calcined at a temperature of 500-550° C. for 4-6 hours. The material obtained after cooling was a Li-form sorbent. Per 1 mol of manganese sulfate, the yield of the sorbent in the Li-form was 101.9 g.

The sorbent was stored in a Li-form in a dry state. Before use, it was soaked in water, loaded into an ion exchange column for conversion into an H-form by treating under dynamic conditions with a solution of 0.15-0.25 mol/l $H_2SO_4$.

The material obtained after cooling was a Li-form sorbent. Per 1 mol of manganese sulfate, the yield of the sorbent in the Li-form was 101.9 g.

Testing of the sorbent was carried out by extracting lithium from a solution (dynamic conditions) having the following composition: (kg/m$^3$): LiCl—0.121; NaCl—150, MgCl$_2$—9.5, CaCl$_2$—6.0, KCl—4.0, KBr—0.2, KI—0.1, NaHCO3—0.2. The ionic ratio of Li$^+$/Na$^+$ was 1:900.

Under conditions of saturation of the cation exchanger with Li$^+$, the process of sorption was characterized by the exchange capacity $E_{Li}$=2.1 mol/kg and the separation factor $K_{Li,Na}$=5.0·10$^5$. Desorption of lithium from cation exchanger proceeded easily and completely under the action of 0.3-0.5 mol/l solution of $HNO_3$. The loss of the sorbent according to the results of its tests for 12 cycles in the ion exchange column amounted to an average of not more than 0.3-0.5% per cycle.

Example 3

Similar to the previous examples, the coagulum of Mn(OH)$_2$ was precipitated by reacting a 1M solutions of MnAc$_2$ with NaOH solution. During the synthesis, an additive of the calculated amount of Al(Ac)$_3$ was introduced into the MnAc$_2$ solution. The Mn(OH)$_2$ coagulum with the addition of Al(OH)$_3$ was obtained in the form of a paste. A pH of the paste was 10.0÷10.1. The resulting coagulum Mn(OH)$_2$ was oxidized. The prepared paste was concentrated on the filter. To do this, ClO$_2$ was bubbled through the paste with stirring. ClO$_2$ was taken in an amount close to the stoichiometry for the oxidation reaction. As a result, a hydrated manganese oxide with an average oxidation degree of manganese of 3.1 to 3.3 was produced. After oxidation of the paste with KMnO$_4$, the final pH of the paste was 9.8÷10.0.

The prepared paste was concentrated in a centrifuge at 6000 min$^{-1}$ for 15 minutes. As a result, the maximum amount of the mother liquor was removed from the paste. Next, the thickened paste was subjected directly to drying and granulation. These processes were carried out in the same manner as in the previous Example 1.

Per 1 mol of manganese sulfate, the output of the dried paste was 141.1 g; anhydrous substance –101.1 g. The bulk density of the dried paste, with a particle size of <3 mm, was about 0.74÷0.76 g/cm$^3$. The moisture content of the paste dried for 4 days was approximately 23.5%.

The obtained granules were loaded into an ion exchange column, where they were treated with 0.5M LiOH solution to saturate $Li^+$ ions. This process and the subsequent drying were performed in the same manner as in Example 1.

The air-dried material was calcined at a temperature of 450-500° C. for 4-6 hours. The material obtained after cooling was a Li-form sorbent. Per 1 mol of manganese sulfate, the yield of the sorbent in the Li-form was 101.9 g.

The sorbent was stored in a Li-form in a dry state. Before use, it was soaked in water, loaded into an ion exchange column for conversion into an H-form by treating under dynamic conditions with a solution of 0.3-0.5 mol/l $HNO_3$.

The material obtained after cooling was a Li-form sorbent. Per 1 mol of manganese sulfate, the yield of the sorbent in the Li-form was 101.9 g.

Testing of the sorbent was carried out by extracting lithium from a solution (dynamic conditions) having the following composition: (kg/m³): LiCl—0.121; NaCl—150, $MgCl_2$—9.5, $CaCl_2$—6.0, KCl—4.0, KBr—0.2, KI—0.1, $NaHCO_3$—0.2. The ionic ratio of $Li^+/Na^+$ was 1:900.

Under conditions of saturation of the cation exchanger with $Li^+$, the process of sorption was characterized by the exchange capacity $E_{Li}$=2.2 mol/kg and the separation factor $K_{Li,Na}$=4.4·10⁵. Desorption of lithium from cation exchanger proceeded easily and completely under the action of 0.3-0.5 mol/l solution of $HNO_3$. The loss of the sorbent according to the results of its tests for 10 cycles in the ion exchange column amounted to an average of not more than 0.3-0.6% per cycle.

Operation conditions and parameters used other examples are summarized in Table 2.

The effect of the synthesis conditions at the preparation of the ion exchanger on sorption properties of the ion exchanger is summarized in Table 1. This table presents the results of tests of sorbents obtained under different conditions of synthesis, but within the framework of the present invention. A solution of the following composition (kg/m³) was used In the ion exchange test: LiCl—0.121; NaCl—150. The ionic ratio of $Li^+/Na^+$ was 1:900 (pH=6.1).

TABLE 1

Effect of synthesis on sorbent properties (with the scope of the invention)

| Sample No. | Amount of added aluminum oxide $\frac{Al_2O_3}{MnO_x}$ | Selective capacity for $Li^+$, ($E_{Li}$, mol/kg) | Coefficient of separation of ions of $Li^+$ and $Na^+$, ($P_{Li,Na}$) | Average degree of Mn oxidation | Synthesis temperature, ° C. |
|---|---|---|---|---|---|
| 1 | 0.000 | 0.80 | 1.3 · 10⁴ | 2.9 | 650 |
| 2 | 0.019 | 0.89 | 4.0 · 10⁴ | 3.0 | 600 |
| 3 | 0.035 | 1.03 | 9.0 · 10⁴ | 3.1 | 550 |
| 4 | 0.050 | 1.30 | 1.7 · 10⁵ | 3.1 | 500 |
| 5 | 0.061 | 1.92 | 2.6 · 10⁵ | 3.2 | 450 |
| 6 | 0.073 | 2.18 | 3.3 · 10⁵ | 3.2 | 450 |
| 7 | 0.085 | 2.02 | 2.1 · 10⁵ | 3.2 | 450 |
| 8 | 0.100 | 1.67 | 1.1 · 10⁵ | 3.3 | 450 |
| 9 | 0.129 | 1.15 | 5.5 · 10⁴ | 3.4 | 450 |
| 10 | 0.153 | 0.88 | 4.0 · 10⁴ | 3.5 | 450 |
| 11 | 0.180 | 0.70 | 3.0 · 10⁴ | 3.6 | 400 |
| 12 | 0.212 | 0.62 | 2.6 · 10⁴ | 3.7 | 350 |
| 13 | 0.250 | 0.58 | 2.1 · 10⁴ | 3.8 | 300 |
| 14 | 0.300 | 0.56 | 0.8 · 10³ | 3.85 | 250 |

Table 2 presents results of tests of sorbents of optimal composition obtained under various conditions of synthesis (including those beyond the scope of the present invention).

TABLE 2

Effect of synthesis conditions on sorbent composition under conditions beyond the scope of the invention

| Sample No. | Amount of added aluminum oxide $\frac{Al_2O_3}{MnO_x}$ | Selective capacity for $Li^+$, ($E_{Li}$, mol/kg) | Coefficient of separation of ions of $Li^+$ and $Na^+$, ($P_{Li,Na}$) | Average degree of Mn oxidation | Synthesis temperature, ° C. |
|---|---|---|---|---|---|
| 1 | 0.075 | 3.066 | 9.52 · 10² | 3.6 | 295 |
| 2 | 0.075 | 3.892 | 1.76 · 10³ | 3.5 | 345 |
| 3 | 0.075 | 4.225 | 1.99 · 10³ | 3.4 | 368 |
| 4 | 0.075 | 4.541 | 2.59 · 10³ | 3.5 | 400 |
| 5 | 0.075 | 5.030 | 4.47 · 10³ | 3.6 | 450 |
| 6 | 0.075 | 5.228 | 8.18 · 10³ | 3.5 | 500 |
| 7 | 0.075 | 5.285 | 1.31 · 10⁴ | 3.4 | 520 |
| 9 | 0.075 | 5.301 | 3.77 · 10⁴ | 3.2 | 545 |
| 9 | 0.075 | 5.323 | 8.33 · 10⁴ | 3.1 | 590 |
| 10 | 0.075 | 5.324 | 1.04 · 10⁵ | 3.0 | 610 |
| 11 | 0.075 | 5.324 | 1.40 · 10⁵ | 2.9 | 645 |

As can be seen from the tables, the results of testing of samples that were prepared within the scope of the invention served the purposes of the invention. On the other hand, the samples that were beyond the scope could not provide the effects of the invention.

The technical and economic advantages of this method in comparison with the base object (the prior-art method) were the following:
- increase in the sorption capacity of the sorbent for lithium in 2.7 times; and the selectivity for lithium in 25 times, and
- 10-15% improvement in the operating properties of the sorbent by reducing its losses in repeated cycles of sorption and desorption.

Thus, it has been shown that the sorbent obtained by the method of the invention is suitable for industrial production of lithium by extraction from complex natural and technological brines.

The method of the invention for obtaining inorganic sorbents for extracting lithium from natural and technological brines was described with reference to specific examples of compositions and technological steps. It is understood, however, that these compositions and process steps were given only as examples and that any changes and modifications are possible within the scope of the attached patent claims. For examples, the units of the synthesis equipment may vary, depending on specific conditions. The brines may be taken from different sources. The sorbents obtained by the method of the invention may find different applications, and the synthesis of the sorbents can be conducted at different temperatures selected according to specific conditions. Various acids can be used in the method.

The invention claimed is:

1. A method of obtaining inorganic sorbents for the extraction of lithium from lithium-containing natural and technological brines, the method comprising the steps of:
   a) obtaining a first non-stoichiometric compound as a precipitate of hydrated mixed oxide of manganese (II) and aluminum (III) by contacting a soluble manganese (II) salt with an alkali solution in the presence of at least one aluminum (III) salt;
   b) obtaining a second non-stoichiometric compound that comprises a precipitate of hydrated mixed oxide of manganese (III), manganese (IV) and aluminum (III) by oxidizing the first non-stoichiometric compound with the use of a solution of an oxidizing agent;

c) isolating the obtained second non-stoichiometric compound to obtain a wet paste of hydrated mixed oxide of manganese (III), manganese (IV) and aluminum (III);

d) obtaining a third non-stoichiometric compound by granulating and simultaneously drying the obtained wet paste of hydrated mixed oxide of manganese (III), manganese (IV) and aluminum (III);

e) obtaining a fourth non-stoichiometric compound by converting the obtained third non-stoichiometric compound into a lithium-form by passing therethrough a lithium-containing solution in an ion-exchange column;

f) calcining the obtained fourth non-stoichiometric compound to obtain a fifth non-stoichiometric compound which comprises a mixed oxide of lithium, manganese (III), manganese (IV) and aluminum (III); and g) obtaining a sixth non-stoichiometric compound by converting the obtained fifth non-stoichiometric compound into a hydrogen-form of inorganic ion-exchanger by treating the fifth non-stoichiometric compound with an acid solution.

2. The method of claim 1, wherein Step a) is carried out with a ratio of manganese (II) to aluminum (III) in the soluble manganese (II) salt and aluminum (III) salt within a range of 1:0 to 1:0.2.

3. The method of claim 1, wherein manganese (II) salt is selected from the group consisting of $MnSO_4$, $MnCl_2$, $Mn(NO_3)_2$, $Mn(Ac)_2$.

4. The method of claim 2, wherein manganese (II) salt is selected from the group consisting of $MnSO_4$, $MnCl_2$, $Mn(NO_3)_2$, $Mn(Ac)_2$.

5. The method of claim 1, wherein at least one aluminum (III) salt is selected from the group consisting of $Al_2(SO_4)_3$, $AlCl_3$, $Al(OH)Cl_2$, $Al(NO_3)_3$, $Al(Ac)_3$, $Na[Al(OH)_4]$.

6. The method of claim 4, wherein at least one aluminum (III) salt is selected from the group consisting of $Al_2(SO_4)_3$, $AlCl_3$, $Al(OH)Cl_2$, $Al(NO_3)_3$, $Al(Ac)_3$, $Na[Al(OH)_4]$.

7. The method of claim 1, wherein the alkali solution used in Step a) is a hydroxide selected from the group consisting of NaOH, KOH, $NH_4OH$.

8. The method of claim 7, wherein the alkali solution used in Step a) is a hydroxide selected from the group consisting of NaOH, KOH, $NH_4OH$.

9. The method of claim 1, wherein the manganese (II) salt is used in concentration within a range of 0.1 mol/l to 2.0 mol/l.

10. The method of claim 4, wherein the manganese (II) salt is used in concentration within a range of 0.1 mol/l to 2.0 mol/l.

11. The method of claim 1, wherein the oxidizing agent used in the step b) is selected from the group consisting of solutions of NaClO, $ClO_2$, $KMnO_4$, $H_2O_2$.

12. The method of claim 1, wherein oxidizing the first non-stoichiometric compound with the use of a solution of an oxidizing agent in Step b) is carried out to reach an average degree of oxidation of manganese in the range of 3.0 to 3.8.

13. The method of claim 1, wherein isolating the obtained second non-stoichiometric compound from the mother solution in Step c) is carried out by a process selected from the group consisting of filtering, centrifuging, and centrifuge filtering.

14. The method of claim 1, wherein isolating the obtained second non-stoichiometric compound from the mother solution in Step c) is carried out until the paste reaches humidity in the range of 50 to 80%.

15. The method of claim 14, wherein the manganese (II) salt is used in concentration within a range of 0.1 mol/l to 2.0 mol/l.

16. The method of claim 10, wherein the oxidizing agent used in the step b) is selected from the group consisting of solutions of NaClO, $ClO_2$, $KMnO_4$, $H_2O_2$, oxidizing the first non-stoichiometric compound with the use of a solution of the oxidizing agent in Step b) is carried out to reach an average degree of oxidation of manganese in the range of 3.0 to 3.8, isolating the obtained second non-stoichiometric compound from the mother solution in Step d) is carried out by a process selected from the group consisting of filtering, centrifuging, and centrifuge filtering, and isolating the obtained second non-stoichiometric compound in Step c) is carried out until the paste reaches humidity in the range of 50 to 80%.

17. The method of claim 1, wherein in Step d) granulating and simultaneously drying the obtained hydrated mixed oxide of manganese (III), manganese (IV) and aluminum (III) is carried out by a process selected from the group consisting of applying paste on a corrugated surface having grooves of a predetermined width and extruding the paste through a die orifice having a diameter, wherein the width is in the range of 2 to 5 mm, and the diameter is in the range of 2 to 5 mm; drying of the paste being carried out at a temperature in a range of 15 to 40° C. and until the paste reaches humidity in the range of 25 to 40%.

18. The method of claim 10, wherein in Step e) converting the hydrated mixed oxide of manganese (III), manganese (IV) and aluminum (III) into a lithium-form of the hydrated mixed oxide of manganese (III), manganese (IV) and aluminum (III) is carried out in an ion-exchange column having a column head with feeding a solution of the lithium-containing compound to the column head and passing the solution through the column with a linear speed in the range 1 to 100 mm/min.

19. The method of claim 18, wherein calcining at Step f) is carried out at a temperature in a range of 300° to 600° C. during time in the range of 1 to 10 hours, converting the obtained fifth non-stoichiometric compound into a hydrogen-form of inorganic ion-exchanger in Step g) by treating the fifth non-stoichiometric compound with an acid solution being carried out by selecting the acid solution of the group consisting of an acid solution of a hydrochloric acid, an acid solution of a nitric acid, and an acid solution of a sulfuric acid, wherein an acid solution has a concentration selected in the range of 0.1 to 2 mol/l.

* * * * *